United States Patent
Birrell et al.

(10) Patent No.: US 7,987,365 B2
(45) Date of Patent: Jul. 26, 2011

(54) SUBSCRIPTION-BASED COMPUTING IMPLEMENTED IN HARDWARE OF COMPUTING DEVICE

(75) Inventors: Andrew David Birrell, Los Altos, CA (US); Charles P. Thacker, Palo Alto, CA (US); Michael Isard, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1194 days.

(21) Appl. No.: 11/388,291

(22) Filed: Mar. 24, 2006

(65) Prior Publication Data

US 2007/0226500 A1    Sep. 27, 2007

(51) Int. Cl.
*H04L 29/00* (2006.01)
(52) U.S. Cl. ........ 713/170; 713/168; 713/169; 713/171; 713/172; 713/173; 713/174; 713/175; 713/176; 713/177; 713/178; 713/179; 713/180; 713/181
(58) Field of Classification Search ................ 726/2–21; 713/168–181
See application file for complete search history.

(56) References Cited

U.S. PATENT DOCUMENTS

| | | | |
|---|---|---|---|
| 6,891,953 B1 * | 5/2005 | DeMello et al. | 380/277 |
| 2002/0136407 A1 * | 9/2002 | Denning et al. | 380/258 |
| 2002/0194010 A1 * | 12/2002 | Bergler et al. | 705/1 |
| 2003/0069854 A1 * | 4/2003 | Hsu et al. | 705/59 |
| 2005/0060584 A1 * | 3/2005 | Ginter et al. | 713/201 |
| 2007/0033419 A1 * | 2/2007 | Kocher et al. | 713/193 |

\* cited by examiner

*Primary Examiner* — Nasser Moazzami
*Assistant Examiner* — Ghazal Shehni
(74) *Attorney, Agent, or Firm* — Woodcock Washburn LLP

(57) ABSTRACT

A subscription-based computing device has hardware and a subscription enforcer implemented in the hardware. The enforcer has an accumulator that accumulates a usage value as the computing device is being used and an expiration value register that stores an expiration value. The enforcer allows the computing device to operate in a subscription mode without hindrance and with full use when the usage value is less than the stored expiration value, and allows the computing device to operate in an expiration mode with hindrance and without full use when the usage value reaches the stored expiration value to signal that the subscription for the computing device has expired.

20 Claims, 5 Drawing Sheets

| | |
|---|---|
| KEY REGISTER: | SYMMETRIC VALIDATION KEY |
| PERSISTENT LOCK BIT: | LOCKS ENFORCER 12 WHEN SET |
| KEY ID REGISTER: | KEY ID FOR KEY |
| SECURE CLOCK OSCILLATOR: | RUNS WHEN POWER IS APPLIED TO SUBSTRATE 18 |
| PERSISTENT RUN-TIME COUNTER: | INCREMENTS COUNT ACCORDING TO OSCILLATOR |
| MAC VALIDATION CIRCUITRY: | VALIDATES MAC OF SUBSCRIPTION TOKEN |
| PERSISTENT RE-SETTABLE EXPIRATION TIME REGISTER: | STORES EXPIRATION TIME FROM LATEST SUBSCRIPTION TOKEN |
| | ENFORCER 12 |

Fig. 3

SUBSCRIPTION-BASED COMPUTING IMPLEMENTED IN HARDWARE OF COMPUTING DEVICE

TECHNICAL FIELD

The present invention relates to a computing device that is operable according to a subscription, where the computing device includes hardware that impairs key functionality of the computing device if the subscription is not kept current. More particularly, the present invention relates to such a computing device where the hardware includes a subscription portion for implementing the subscription-based computing, where the subscription portion is simple in operation and design but trustworthy.

BACKGROUND OF THE INVENTION

In a personal computing device, such as for example a desktop or laptop personal computer, a portable data assistant, a portable media player, a portable communications device such as a mobile telephone, and the like, the device as acquired usually includes certain computer hardware and a software operating system operable on the hardware to provide expected computing functionality. Significantly, acquisition of the device including the hardware and the software also includes one or more licenses or other rights to employ the hardware and software, typically in perpetuity or at least for the serviceable life of the computing device. As may be appreciated, each such license may be implicit and/or explicit.

Thus, with such 'in perpetuity' licenses, acquisition of a computing device typically includes acquisition of the right over a relatively long if not indefinite term to employ the computing device. Note, though, that in at least some instances, it may be advisable to offer the right to employ the computing device over a relatively shorter and definite term that may be renewable. Put another way, it may be advisable to offer the right to employ the computing device on a subscription basis where the right to employ the computing device is contingent upon a corresponding subscription being current. Thus, if the subscription expires, so too does the right to employ the computing device. Similarly, if the subscription after expiring is reinstated, so too does the right to employ the computing device. Presumably, although not necessarily, the subscription is renewed or otherwise extended for some monetary consideration at predetermined terms.

From the point of view of an acquirer of the computing device, acquiring the right to employ the computing device on a subscription basis may be preferable due to many considerations. For one example, if the computing device is acquired on a renewable subscription basis, a user of the computing device is more mindful of the periodic expense of the computing device as represented by the cost of the subscription, and is more likely to upgrade the computing device and/or the software thereon to keep the computing device more current. For another example, if the cost of a renewable subscription represents the bulk of the cost of the computing device, tax considerations may actually favor such subscription as a deductible expense. Otherwise, the computing device would be an asset that at best can be depreciated, but at less favorable terms as compared to the deductible expense of the subscription.

Of course, from the point of view of a provider of the hardware and/or software of the computing device, providing the right to employ the computing device on a subscription basis may be preferable due to similar considerations. For one example, if the computing device is acquired on a renewable subscription basis, a user of the computing device that upgrades the hardware and/or the software potentially represents additional revenue. For another example, the cost of a renewable subscription represents a potentially limitless stream of revenue on an ongoing basis.

However, enforcing a subscription at a computing device can be difficult. Of course, a user at a subscription-based computing device may be made to promise to abide by the subscription terms, but such a promise is easily made and easily broken. Moreover, while software-based mechanisms exist for enforcing such subscription terms, such software-based mechanisms can be complex and/or can require a more-or-less continuous network connection to a subscription service. At any rate, such software-based mechanisms can potentially be subverted by a determined user.

Accordingly, a need exists for a hardware-based mechanism for enforcing the terms of a subscription for a subscription-based computing device. In particular, a need exists for such a mechanism that is relatively simple and trustworthy. In addition, a need exists for such a mechanism that does not require a more-or-less continuous network connection to a subscription service, and that cannot be subverted by a determined user without great difficulty.

SUMMARY OF THE INVENTION

The aforementioned need is satisfied by the present invention in which a subscription-based computing device has hardware and a subscription enforcer implemented in the hardware such that a level of use of at least a portion of the computing device is premised upon whether a corresponding subscription to so use is current. The enforcer has a secure accumulator that accumulates a usage value as the computing device is being used, where the secure accumulator is persistent and non-volatile and preserves the accumulated usage value therein even when power is not applied to the hardware. The enforcer also has a persistent re-settable expiration value register that stores an expiration value, where the expiration value register is accessible and re-settable only by the enforcer. The enforcer allows the computing device to operate in a subscription mode without hindrance and with full use when the usage value in the accumulator is less than the stored expiration value in the expiration value register, and allows the computing device to operate in an expiration mode with hindrance and without full use when the usage value in the accumulator reaches the stored expiration value in the expiration value register to signal that the subscription for the computing device has expired.

A subscription extension token is obtainable for the enforcer prior to or after the subscription has expired. The token includes therein an extended expiration value, a key ID, and a validation signature based on the extended expiration value and the key ID, where the validation signature is for being validated according to a validation key corresponding to the key ID. The enforcer further has a key register having stored therein a validation key accessible only by the enforcer, a key ID register having stored therein a key ID corresponding to and identifying the validation key stored in the key register, and a validator for validating the validation signature of an obtained subscription extension token. Upon receiving an obtained token, the enforcer resets the expiration value in the expiration value register to the extended expiration value of the obtained token if the key ID in the obtained token matches the key ID in the key ID register and if the validator validates the validation signature of the obtained token based on the key in the key register.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 3 is a block diagram showing various items stored in an enforcer on the hardware of the computing device of FIG. 2 in accordance with one embodiment of the present invention, where the enforcer enforces the subscription-based use of the computing device.

DETAILED DESCRIPTION OF THE INVENTION

Computer Environment

Figure 1:
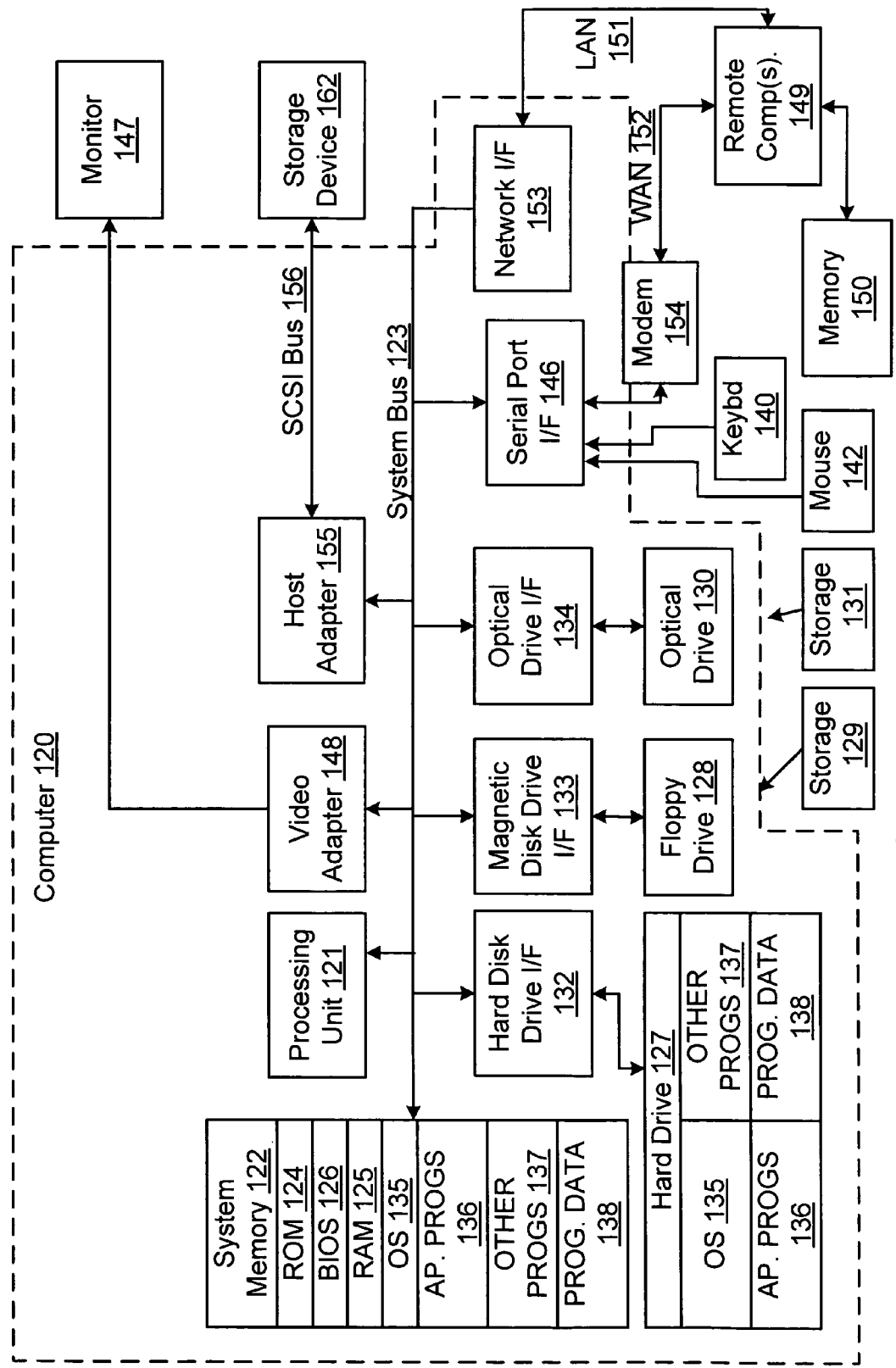
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Subscription-Based Computing Implemented in Hardware

In one embodiment of the present invention, subscription-based computing is implemented in hardware of a computing device such that use of at least a portion of the hardware and/or at least a portion of the software of the computing device is premised upon obtaining a corresponding subscription to so use. Such subscription may be obtained in any appropriate manner without departing from the spirit and scope of the present invention. For example, the subscription may be obtained in exchange for some amount of monetary consideration, or may be obtained in exchange for some other form of consideration. Obtaining a subscription is generally known or should be apparent to the relevant public and therefore need not be set forth herein in any detail, except to say that as proof of a subscription, the computing device in one embodiment of the present invention requires a subscription token or the like. As may be appreciated, such a token specifies information relating to the subscription such as a length or the like, and such a token should be provided by a source acceptable to the computing device and can be validated to confirm such source.

Figure 2:
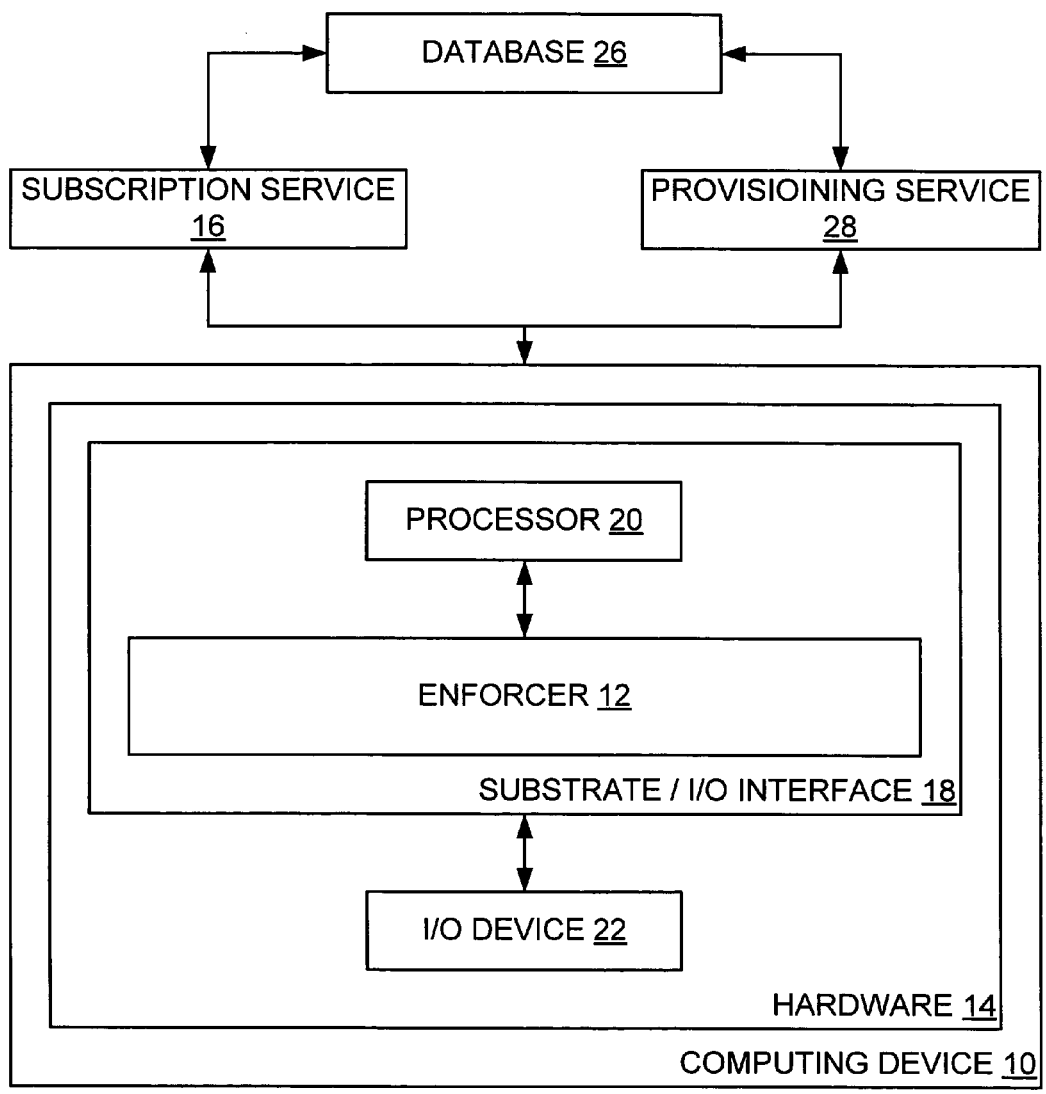
FIG. 2 is a block diagram showing a computing device in communication with a subscription service in accordance with one embodiment of the present invention.

Turning now to FIG. 2, it is seen that in one embodiment of the present invention, the period of the subscription is enforced at a computing device 10 by way of a subscription enforcer 12 within the hardware 14 of such computing device 10. Note that the computing device 10 may be any appropriate computing device without departing from the spirit and scope of the present invention. For example, the computing device 10 may be a personal desktop or laptop computer, a portable data assistant, gaming console, a media player, and the like.

Generally, the enforcer 12 occupies a position within such hardware 14 such that if the subscription expires or is otherwise not kept current, the enforcer 12 hinders use of the hardware 14 so as to effectively prevent a user from employing the computing device 10 in any substantial manner. However, in so hindering the use of the hardware 14, the enforcer 12 should not go so far as to disable use of the computing device 10. In particular, it is considered necessary to continue to allow some minimal level of use of the computing device 10 if only so that a user may employ the computing device 10 to contact a subscription service 16 by way of an appropriate network connection or the like, obtain a renewed or otherwise current subscription, obtain a representative token of such subscription, and deliver the token to the enforcer 12.

As may be appreciated, the enforcer 12 may be placed in any appropriate position within the hardware 14 of the computing device without departing from the spirit and scope of the present invention as long as the enforcer 12 as positioned can appropriately perform the subscription enforcement function as set forth in more detail below. For one example, and in one embodiment of the present invention, and as shown in FIG. 2, the enforcer 12 may be included within an I/O interface 18 that interfaces a processor 20 of the computing device 10 to one or more input/output devices 22. As may be appreciated, such an I/O interface 18 is sometimes referred to as a 'south bridge', primarily for historical reasons.

As may also be appreciated, including the enforcer 12 with the I/O interface 18 is advantageous in that such I/O interface 18 is typically separate from the processor 20 and thus more amenable to modification to include such enforcer 12. More significantly, by being positioned in the I/O interface 18, the enforcer 12 can perform the aforementioned hindering function when the subscription for the computing device 10 expires by slowing the I/O functions performed by the I/O interface 18 to the point where the computing device is effectively limited in use except for obtaining a renewed subscription.

For another example, the enforcer 12 may be included within the graphics hardware of the computing device 10 (not shown). Here, the enforcer 12 can perform the aforementioned hindering function when the subscription for the computing device 10 expires by slowing the graphics functions performed by the graphics hardware to the point where the computing device can only perform basic graphics functions. Note, though, that the graphics hardware may not be as amendable to modification as the I/O interface 18.

In one embodiment of the present invention, and generally speaking, the enforcer 12 allows the computing device 10 to operate without hindrance until a predetermined subscription expiration time, expressed either as units of time or time-equivalent units. Such amount of subscription time may be any amount without departing from the spirit and scope of the present invention. For continued operation without hindrance, a user of the computing device 10 must effectuate a transaction with the subscription service 16 or an agent thereof by way of an appropriate network connection or the like to obtain a new subscription token. Typically, the subscription token includes some identification of the subscription service 16 and a new subscription expiration time. While no specific operating system software is deemed necessary to effectuate the enforcer 12 at the computing device 10, it may be advisable to provide an application or the like that assist in communicating with the subscription service 16 and that allows the operating system of the computing device 10 to communicate each new subscription token to the enforcer 12.

The enforcer 12 may itself contain a minimal amount of software to process each new subscription token by validating same and upon such validation storing the new subscription expiration time as set forth according to such token. To simplify matters, and if feasible, the enforcer 12 may itself contain no software and instead may process each new subscription token by circuitry alone. Notably, inasmuch as the enforcer 12 is time-based, such enforcer 12 should have access to a clock or the like. However, if such a clock or the like is external to the enforcer 12, a mildly determined user can subvert the enforcer 12 by resetting or rolling back the clock or the like. Accordingly, in one embodiment of the present invention, the clock or the like is internal to the enforcer 12 and is externally inaccessible. Also, to simplify matters, the clock or the like may in fact be a counter that stores a periodically incrementing count, as is shown in FIG. 3. Thus, the subscription expiration time in each new token must be expressed according to the count of the counter in a manner that should be known or apparent to the relevant public and therefore need not be set forth herein in any detail.

As should now be appreciated, if for some reason the count of the counter is allowed to reach or exceed a value representative of the subscription expiration time, the enforcer 12 allows the computing device 10 to operate but in a hindered or degraded manner. In such hindered manner, the computing device 10 has sufficient functionality to contact the subscription service 16 to obtain a new subscription token with a new subscription expiration time. However, such computing device 10 does not have sufficient functionality to provide a useful user experience for normal tasks. In the case where, as shown, the enforcer 12 is part of the I/O interface 18, such hindering may occur by reducing the I/O rate of the interface 18 to some minimal value.

Upon receiving a new subscription token with a new subscription expiration time, the enforcer 12 validates same by validating a signature or the like of the token. Note, though that to simplify matters, the signature may take the form of a MAC or the like which can be validated in a relatively simple manner based on a symmetric key, as opposed to a public-private digital signature which can be validated in a relatively complex manner based on one of a pair of asymmetric keys. Note, too, that as is known, a MAC may be validated based on hardware only, and thus the enforcer 12 need not be encumbered with software in this regard. In one embodiment of the present invention, the symmetric MAC validation key is installed in the enforcer 12 during manufacturing thereof, in a manner set forth in more detail below.

Turning now to FIG. 3, it is seen that in one embodiment of the present invention, the enforcer 12 is provided with the following hardware features, each of which may be implemented as logic within the I/O interface or substrate 18 or the like (hereinafter, "the substrate 18"):

- A key register that contains the symmetric validation key. The key register is implemented by programmable fuses at the time the substrate 18 is manufactured and/or tested or the like. Such validation key can be externally read from the key register only until the enforcer 12 on the substrate 18 is locked, after which only the enforcer 12 may read such key.
- A persistent lock bit that when set 'locks' the enforcer 12 on the substrate 18. In particular, after the lock bit is set and the enforcer 12 is thus locked, the validation key can only be read from the key register by the enforcer 12 itself. Presumably, the persistent lock bit upon being set cannot be reset.
- A key ID register that contains a key ID as an identification of the validation key as stored in the key register. The key ID register is also implemented by programmable fuses at the time the substrate 18 is manufactured and/or tested or the like. However, and unlike the key register, the key ID register can be read externally even after the lock bit is set. As will be seen below, the subscription service 16 is provided with the key ID from the key ID register on the substrate 18, and employs such key ID to look up the corresponding symmetric validation key in a secure database 26 (FIG. 2) available to such subscription service 16.
- A secure clock oscillator that runs whenever power is applied to the substrate 18. As was noted above, the oscillator cannot be externally accessible and is contained entirely on the substrate 18. The oscillator can have a frequency on the order of 1 Hz or so.
- A persistent run-time counter that in combination with the oscillator stores the aforementioned periodically incrementing count. The counter may increment on each pulse from the clock or the like whenever power is applied to the substrate 18. The counter may be written as a register until the enforcer 12 is locked by way of the aforementioned lock bit, after which the counter is read-only. The counter is persistent and non-volatile and preserves the count therein even when power is not applied. Thus, the incrementing of the count within the counter resumes when power is re-applied. The counter and oscillator in combination should be able to store the equivalent of at least the reasonable life span of the computing device 10, at a minimum. For example, if the oscillator operates at 1 Hz and the counter increments on each pulse from the oscillator and has 32 bits, the counter may register on the order of about 136 years before overflowing.
- Circuitry to validate the MAC of the subscription token without the need for software. The MAC may be based on HMAC (RFC 2104) and SHA-256. As will be seen below, the token need not be encrypted inasmuch as the information therein need not be kept secret. However, validation of the MAC is needed to detect any alteration to such information in an attempt to subvert the enforcer 12.
- A persistent re-settable expiration time register that stores the expiration time as provided by the latest subscription token. Prior to locking the enforcer 12 by way of the lock bit, the stored expiration time in the expiration time register can be read or written. After locking, though, the register can only be loaded with a stored expiration time as provided in a subscription token.

As may be appreciated, the stored expiration time in the register is expressed according to the count in the run-time counter. That is, the count must be less than the stored expiration time for the enforcer 12 to allow the computing device 10 to operate in a subscription mode without hindrance and with full use. However, if the count reaches the stored expiration time, the enforcer 12 in fact only allows the computing device 10 to operate in an expiration mode with hindrance and without full use. Put simply, then, the corresponding subscription for the computing device expires when the count in the counter reaches the stored expiration time in the register.

Note that upon such expiration, the counter may or may not stop incrementing. Note too that it may be advisable to place an upper limit on the amount of additional time the enforcer 12 can accept from a subscription token so as to avoid accidentally setting the expiration time to near-infinity. Note further that by incrementing the count only when power is applied to the substrate, the subscription of the present invention is consumed only when the computing device 10 is in use, and is not based on calendar times or other set times. Thus, renewing a subscription takes the form of acquiring additional usage time such as for example an additional 100 hours. Of course, the renewal of the subscription may take other forms without departing from the spirit and scope of the present invention. Note moreover that because all stored information is accessible from the enforcer 12 on the substrate 18 before the lock bit is set, the substrate 18 and the enforcer 12 thereon can be tested thoroughly.

Note finally that the enforcer 12 should be implemented on the substrate 18 with circuitry only and without the use of software, especially inasmuch as a non-software implementation is less susceptible to being subverted by external attack. Implementing the enforcer 12 on the substrate 18 without software may be performed in any appropriate manner without departing from the spirit and scope of the present invention. Such non-software implementation is known or should be apparent to the relevant public and therefore need not be set forth herein in any detail.

Provisioning the Enforcer 12 on the Substrate 18

Figure 4:
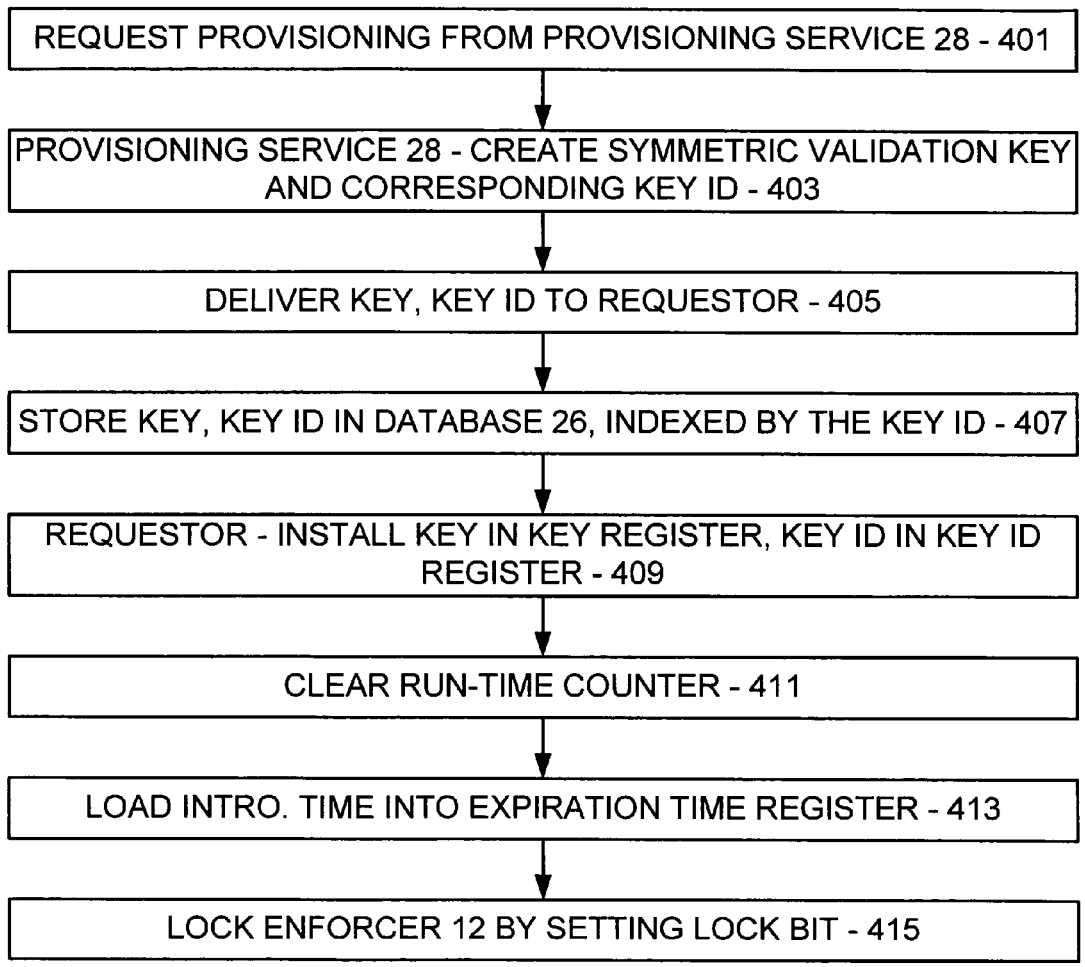
FIGS. 4 and 5 are flow diagrams showing key steps performed in accordance with embodiments of the present invention in the course of provisioning the enforcer of FIG. 3 (FIG. 4) and extending the subscription enforced by such enforcer (FIG. 5).

As may be appreciated, prior to being employed, the enforcer 12 must be at least initially set up or provisioned on the substrate 18. Typically, although not necessarily, such provisioning occurs during the manufacture of the substrate 18 by a manufacturer thereof or the like, or else during the manufacture of the computing device 10 with the substrate 18 therein by a manufacturer thereof or the like. In one embodiment of the present invention, and turning now to FIG. 4, such provisioning occurs upon the manufacturer or the like requesting provisioning from a provisioning service 28 such as that seen in FIG. 2 (step 401). Such provisioning service 28 may be any appropriate provisioning service without departing from the spirit and scope of the present invention. Such provisioning service 28 should at least be apparent based on the present disclosure and therefore need not be set forth in any detail except as provided. Note that the provisioning service 28 may be separate from the subscription service 16 or may be the subscription service 16 without departing from the spirit and scope of the present invention.

At any rate, upon receiving the request for provisioning each of at least one or more enforcers 12, the provisioning service 28 for each enforcer 12 creates a symmetric validation key and a corresponding key ID (step 403), delivers same to the requester by way of a cryptographically secure communications medium (step 405), and stores a copy of the key and the key ID in the secure database 26, indexed by the key ID, perhaps along with other related information such as an identification of the requestor and a current expiration time (step 407). Note here, that each key ID may simply be a monotonically increasing integer, or might be more complex and encode other information. Note too that the provisioning service 28 should not reuse keys or key IDs issued previously.

Upon receiving the key and the key ID, the manufacturer or the like installs same in the key register and key ID register of the enforcer 12, respectively (step 409), clears the run-time counter (step 411), loads the equivalent of some introductory period of time such as for example a day, a week, or a month into the expiration time register (step 413), and then locks the enforcer 12 by setting the lock bit (step 415). Thus, with the lock bit set and the enforcer locked, and as was set forth above, the validation key cannot be externally read from the key register, the key ID register and the run-time counter can be read but not written, and the expiration time register can only be loaded by the enforcer 12 with a stored expiration time as provided in a subscription token. Thereafter, the substrate 18 with the locked enforcer 12 can be forwarded for further manufacturing such as for example incorporation within a computing device 10 and/or for shipping within a computing device 10 to an end user.

Operation of Computing Device 10 with Enforcer 12

Figure 5:
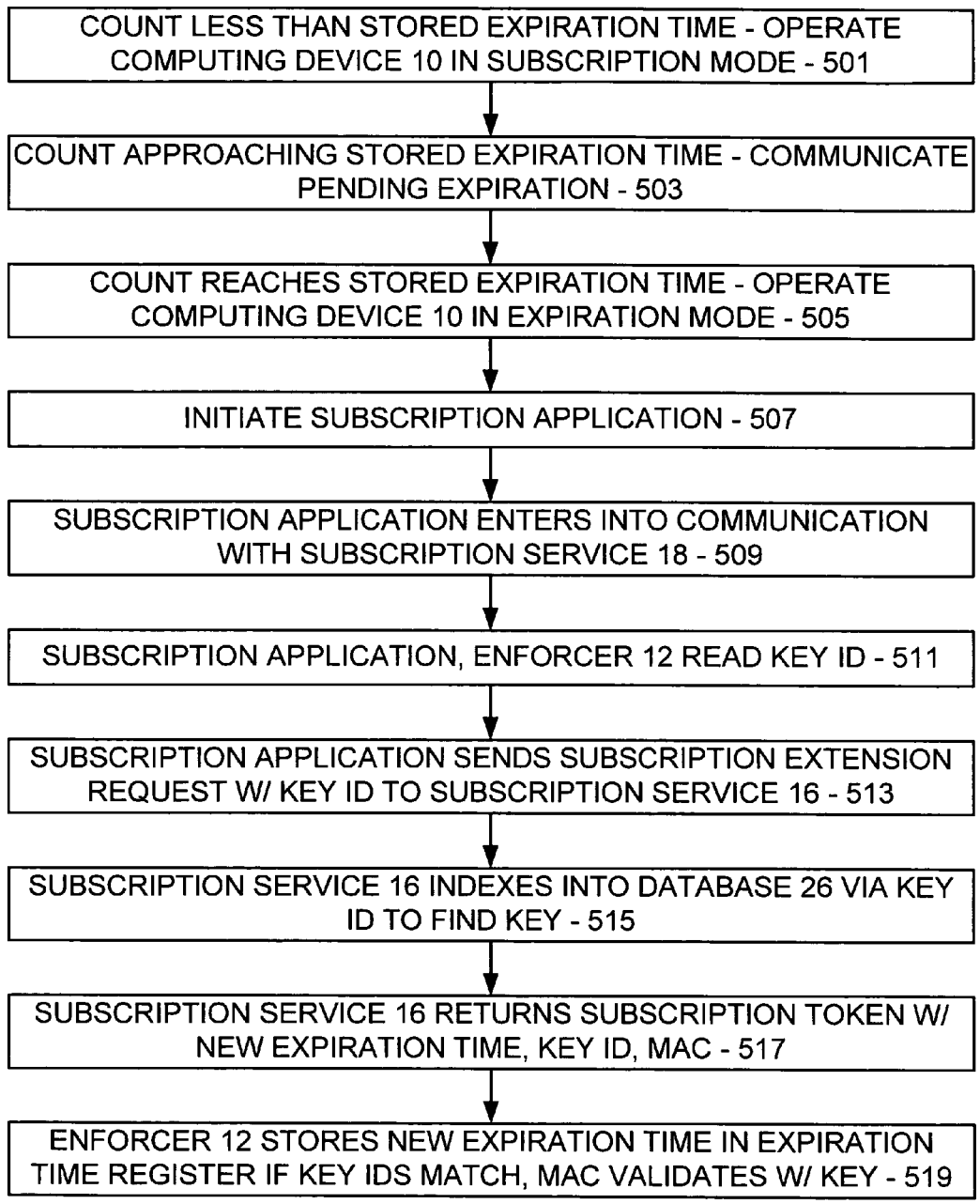

Generally, and as was set forth above, during normal operation of the computing device 10 with the enforcer 12, the run-time counter of the enforcer 12 increments according to the clock oscillator of such enforcer 12 toward the stored expiration time in the expiration time register of such enforcer 12. Thus, and turning now to FIG. 5, as long as the count is less than the stored expiration time, the enforcer 12 allows the computing device 10 to operate in a subscription mode without hindrance and with full use (step 501). However, if the count reaches the stored expiration time, the enforcer 12 in fact only allows the computing device 10 to operate in an expiration mode with hindrance and without full use (step 505).

Note that during normal operation, the enforcer 12 can communicate to a user or the like by way of the computing device 10 a warning that the count is approaching the stored expiration time and the subscription for the computing device 10 is about to expire (step 503), for example if the equivalent of one day or one hour of time is left. As may be appreciated, with such a warning, the user or the like can preemptively extend the subscription without the computing device entering the expiration mode. Thus, such subscription extension can take place with relative ease during subscription mode, and need not take place with relative difficulty during expiration mode.

At any rate, to in fact obtain the extension of the subscription, the user initiates a subscription application on the computing device 10 (step 507) and the subscription application enters into communication with the subscription service 18 over an appropriate communications medium (step 509). In connection therewith, the subscription application and the enforcer 12 cooperate to read the key ID from the key ID register of the enforcer 12 (step 511), and the subscription application sends a subscription extension request to the subscription service 16 (step 513). As may be appreciated, such request includes the key ID and perhaps also other information such as a form of monetary consideration for such subscription extension and a requested amount of extension time.

The subscription service 16 upon receiving the request processes same by employing the key ID therein to index into the secure database 26 to find the corresponding key and any associated current expiration time (step 515). Note that if the request is an initial request with regard to the key ID, the subscription service may also note in the database 26 that the corresponding key is now in use, as well as related information. At any rate, the subscription service 16 in response to the request constructs and returns to the requestor a subscription token including an appropriate new expiration time, the key ID, and a MAC of the concatenation of such expiration time and key ID (step 517). In addition, the subscription service 16 may store the new expiration time in the database 26 as the current expiration time.

Upon receiving the subscription token, the application loads same into the enforcer 12 for processing, whereby the enforcer 12 retrieves the key and the key ID from the respective registers and employ same to process the subscription token. In particular, the enforcer resets the expiration time in the expiration time register to the new expiration time, but only if the key ID in the subscription token matches and if the MAC of the subscription token validates based on the key (step 519). Otherwise, the token is ignored.

As should now be appreciated, a nefarious entity wishing to subvert the enforcer 12 by way of a bogus token should not be able to do so because such entity should not have access to the validation key and thus should not be able to construct a MAC that will validate based on such validation key. Moreover, if such a nefarious entity were to attempt to subvert the enforcer 12 by way of a genuine token for the enforcer 12 that has been altered to have a later expiration time, or by way of a genuine token for another enforcer 12 that has been altered to have the key ID of the enforcer 12, either such attempt should fail inasmuch as the altered token should not validate. Likewise, if such a nefarious entity were to attempt to subvert the enforcer 12 by way of a genuine token for another enforcer 12 with a different key ID, such an attempt should also fail inasmuch as the key ID does not match the key ID of the enforcer 12.

The subscription system set forth herein is relatively simple yet offers substantial security. Such system does not require cryptography, a certificate infrastructure, secure communication, or participation by any particular type of operating system. Although one attack on the subscription system is that an individual may attempt to remove same from the substrate 18 thereof, such attack is likely difficult if not impossible in any substrate 18 of even minimal complexity. Possibly the only substantial attack on such subscription system is that the substrate 18 with the enforcer 12 could be removed and replaced with a similar substrate 18 having no such enforcer 12. However, such a similar substrate 18 likely would not be the product of an amateur in an improvised setting, especially inasmuch as the substrate 18 does itself have substantial complexity. Although a vendor could supply such a substrate, such vendor would be foolish to do so for legal reasons among others.

Since the subscription system set forth herein is relatively simple yet secure, such system can likely be used in even inexpensive devices, and perhaps different purposes. Significantly, the incentive for theft of a computing device 10 having such system is substantially reduced if a potential thief knows that the subscription for the device 10 will terminate shortly, and if the key ID or the like of the device is communicated to the subscription service 16 and database 26, such subscription service 16 can be alerted to refuse any subscription extension request for such stolen device 10. Correspondingly, any such request may be employed to track the stolen device 10 to the thief.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful hardware-based enforcer 12 for enforcing the terms of a subscription for a subscription-based computing device 10. The enforcer 12 is relatively simple and trustworthy, does not require a more-or-less continuous network connection to a subscription service 16, and cannot be subverted by a determined user without great difficulty.

It should be appreciated that changes could be made to the embodiments described above without departing from the inventive concepts thereof. For example, although the present invention has been set forth herein in terms of a time-based subscription, such subscription may be based on any other measurable quantity, such as for example a number of I/O operations, a number of read or write accesses, etc. It should be understood, therefore, that this invention is not limited to the particular embodiments disclosed, but it is intended to cover modifications within the spirit and scope of the present invention as defined by the appended claims.

The invention claimed is:

1. A subscription-based computing device having hardware and a subscription enforcer implemented in the hardware such that the level of use of at least a portion of the computing device is premised upon whether a corresponding subscription to so use is current, the subscription enforcer comprising:

a secure accumulator accumulating a usage value as the computing device is being used, the secure accumulator being persistent and non-volatile and preserving the accumulated usage value therein even when power is not applied to the hardware;

a persistent re-settable expiration value register for storing an expiration value, the expiration value register being accessible and re-settable only by the subscription enforcer, the subscription enforcer allowing the computing device to operate in a subscription mode without hindrance and with full use when the usage value in the accumulator is less than the stored expiration value in the expiration value register, and allowing the computing device to operate in an expiration mode comprising hindering the use of the computing device hardware to a minimal functional level of use comprising use sufficient to at least communicate with the subscription service and to re-set the expiration value register to a new expiration value when the usage value in the accumulator reaches the stored expiration value in the expiration value register to signal that the subscription for the computing device has expired;

a subscription extension token that is obtainable for the subscription enforcer prior to or after the subscription has expired, the token including therein an extended expiration value, a key ID, and a validation signature based on the extended expiration value and the key ID, the validation signature for being validated according to a validation key corresponding to the key ID;

a key register having stored therein a validation key accessible only by the subscription enforcer;

a key ID register having stored therein a key ID corresponding to and identifying the validation key stored in the key register; and a validator for validating the validation signature of an obtained subscription extension token, whereby upon receiving an obtained token, the subscription enforcer resets the expiration value in the expiration value register to the extended expiration value of the obtained token and removes the hindrance to the computing device hardware if the key ID in the obtained token matches the key ID in the key ID register and if the validator validates the validation signature of the obtained token based on the key in the key register.

2. The computing device of claim 1 wherein the subscription enforcer is implemented in an I/O interface interfacing a processor of the computing device to one or more input/output devices.

3. The computing device of claim 2 wherein the subscription enforcer implemented in the I/O interface hinders the computing device during the expiration mode by slowing I/O functions performed by the I/O interface such that the computing device is limited in use.

4. The computing device of claim 1 wherein the secure accumulator comprises a secure clock having a secure clock oscillator that runs to produce pulses whenever power is applied to the hardware and a persistent run-time counter that stores a periodically incrementing count based on the pulses of the oscillator.

5. The computing device of claim 1 wherein the validator includes validation circuitry that validates a MAC of the subscription token.

6. The computing device of claim 1 wherein the persistent re-settable expiration value register stores an expiration value corresponding to an expiration time.

7. The computing device of claim 1 wherein the validation signature of an obtained token is for being validated according to a symmetric validation key, wherein the key register has stored therein a symmetric validation key accessible only by the subscription enforcer, and wherein the validator comprises validation circuitry for validating the validation signature of an obtained token.

8. A subscription enforcer implemented in hardware on a subscription-based computing device such that a level of use of at least a portion of the computing device is premised upon whether a corresponding subscription to so use is current, the subscription enforcer comprising:

a secure accumulator accumulating a usage value as the computing device is being used, the secure accumulator being persistent and non-volatile and preserving the accumulated usage value therein even when power is not applied to the hardware;

a persistent re-settable expiration value register for storing an expiration value, the expiration value register being accessible and re-settable only by the subscription enforcer, the subscription enforcer allowing the computing device to operate in a subscription mode without hindrance and with full use when the usage value in the accumulator is less than the stored expiration value in the expiration value register, and allowing the computing device to operate in an expiration mode comprising hindering the use of the computing device hardware to a minimal functional level of use comprising use sufficient to at least communicate with the subscription service and to re-set the expiration value register to a new expiration value when the usage value in the accumulator reaches the stored expiration value in the expiration value register to signal that the subscription for the computing device has expired;

a subscription extension token that is obtainable for the subscription enforcer prior to or after the subscription has expired, the token including therein an extended expiration value, a key ID, and a validation signature based on the extended expiration value and the key ID, the validation signature for being validated according to a validation key corresponding to the key ID;

a key register having stored therein a validation key accessible only by the subscription enforcer;

a key ID register having stored therein a key ID corresponding to and identifying the validation key stored in the key register; and a validator for validating the validation signature of an obtained subscription extension token, whereby upon receiving an obtained token, the subscription enforcer resets the expiration value in the expiration value register to the extended expiration value of the obtained token and removes the hindrance to the computing device hardware if the key ID in the obtained token matches the key ID in the key ID register and if the validator validates the validation signature of the obtained token based on the key in the key register.

9. The subscription enforcer of claim 8 implemented in an I/O interface interfacing a processor of the computing device to one or more input/output devices.

10. The subscription enforcer of claim 9 wherein hindering the computing device during the expiration mode is achieved by slowing I/O functions performed by the I/O interface such that the computing device is limited in use.

11. The subscription enforcer of claim 8 wherein the secure accumulator comprises a secure clock having a secure clock oscillator that runs to produce pulses whenever power is applied to the hardware and a persistent run-time counter that stores a periodically incrementing count based on the pulses of the oscillator.

12. The subscription enforcer of claim 8 wherein the validator includes validation circuitry that validates a MAC of the subscription token.

13. The subscription enforcer of claim 8 wherein the persistent re-settable expiration value register stores an expiration value corresponding to an expiration time.

14. The subscription enforcer of claim 8 wherein the validation signature of an obtained token is for being validated according to a symmetric validation key, wherein the key register has stored therein a symmetric validation key accessible only by the subscription enforcer, and wherein the validator comprises validation circuitry for validating the validation signature of an obtained token.

15. A method of enforcing a subscription to use a subscription-based computing device such that a level of use of at least a portion of the computing device is premised upon whether the subscription is current, the method comprising:

securely accumulating a usage value as the computing device is being used, the accumulated usage value being persistent and non-volatile and preserved even when power is not applied to the computing device;

allowing the computing device to operate in a subscription mode without hindrance and with full use when the usage value is less than an expiration value as stored in a persistent re-settable expiration value register;

allowing the computing device to operate in an expiration mode comprising hindering the use of the computing device hardware to a minimal functional level of use comprising use sufficient to at least communicate with the subscription service and to re-set the expiration value register to a new expiration value when the usage value reaches the stored expiration value in the expiration value register to signal that the subscription for the computing device has expired;

obtaining a subscription extension token prior to or after the subscription has expired, the token including therein an extended expiration value, a key ID, and a validation signature based on the extended expiration value and the key ID; and resetting the expiration value in the expiration value register to the extended expiration value of the obtained token and removing the hindrance to the computing device hardware if the key ID in the obtained token matches a key ID of the computing device and if the validation signature of the obtained token validates based on a key of the computing device corresponding to the key ID of the computing device.

16. The method of claim 15 performed by a subscription enforcer implemented in an I/O interface of the computing device interfacing a processor of the computing device to one or more input/output devices.

17. The method of claim 16 wherein the subscription enforcer implemented in the I/O interface hinders the computing device during the expiration mode by slowing I/O function performed by the I/O interface such that the computing device is limited in use.

18. The method of claim 15 wherein securely accumulating a usage value comprises storing a periodically incrementing count based on pulses from an oscillator as the computing device is being used wherein the secure accumulator comprises a secure clock having a secure clock oscillator that runs to produce pulses whenever power is applied to the hardware and a persistent run-time counter that stores a periodically incrementing count based on the pulses of the oscillator.

19. The method of claim 15 comprising resetting the expiration value to a value corresponding to an expiration time.

20. The method of claim 15 comprising validating the validation signature according to a symmetric validation key.

* * * * *